United States Patent [19]

Zifferer et al.

[11] Patent Number: 5,127,099
[45] Date of Patent: Jun. 30, 1992

[54] METHOD AND APPARATUS FOR SECURING ACCESS TO A LADDER LOGIC PROGRAMMING AND MONITORING SYSTEM

[75] Inventors: Scott C. Zifferer, Mequon; Joseph J. Menter, Jr., Milwaukee, both of Wis.

[73] Assignee: Icom, Inc., West Allis, Wis.

[21] Appl. No.: 375,270

[22] Filed: Jun. 30, 1989

[51] Int. Cl.⁵ .......................................... H04L 9/00
[52] U.S. Cl. ........................ 395/725; 364/949.91; 364/DIG. 2; 364/918.7
[58] Field of Search ... 364/200 MS File, 900 MS File; 340/825.3, 825.31, 825.34; 178/22.08

[56] References Cited

U.S. PATENT DOCUMENTS

| | | |
|---|---|---|
| 3,686,639 | 8/1972 | Fletcher et al. |
| 3,806,882 | 4/1974 | Clarke ............................ 364/200 |
| 3,813,649 | 5/1974 | Struger et al. |
| 3,882,305 | 5/1975 | Johnstone |
| 3,964,026 | 6/1976 | Yamauchi et al. |
| 3,978,454 | 8/1976 | Willard ........................... 364/900 |
| 4,038,533 | 7/1977 | Dummermuth et al. |
| 4,200,914 | 4/1980 | Kintner |
| 4,227,247 | 10/1980 | Kintner ........................... 364/900 |
| 4,244,034 | 1/1981 | Cherba ............................ 364/900 |
| 4,247,901 | 1/1981 | Martin et al. ................... 364/900 |
| 4,316,260 | 2/1982 | Hideshima ...................... 364/900 |
| 4,396,974 | 8/1983 | Imazeki et al. ................. 364/138 |
| 4,415,965 | 11/1983 | Imazeki et al. ................. 364/136 |
| 4,430,728 | 2/1984 | Beitel ............................. 364/900 |
| 4,445,169 | 4/1984 | Wakiti et al. .................... 364/147 |
| 4,449,040 | 5/1984 | Matsuoka et al. ............... 235/380 |
| 4,449,180 | 5/1984 | Ohshima et al. ................ 364/147 |
| 4,486,830 | 12/1984 | Taylor, Jr. et al. ............. 364/146 |
| 4,488,258 | 12/1984 | Struger et al. .................. 364/900 |
| 4,504,900 | 3/1985 | Yomogida et al. .............. 364/140 |
| 4,521,846 | 6/1985 | Scalzi et al. .................... 364/200 |
| 4,544,997 | 8/1985 | Furgerson ....................... 362/263 |
| 4,616,307 | 10/1986 | Kusumi et al. .................. 364/147 |
| 4,635,183 | 1/1987 | Isobe et al. ..................... 364/141 |
| 4,644,478 | 2/1987 | Stephens et al. ................ 364/550 |
| 4,651,279 | 3/1987 | Suzuki ............................ 364/405 |
| 4,652,990 | 3/1987 | Pailen et al. .................... 364/200 |
| 4,661,899 | 4/1987 | Usuda ............................. 364/171 |
| 4,663,704 | 5/1987 | Jones et al. ..................... 364/188 |
| 4,703,414 | 10/1987 | Inoue et al. ..................... 364/147 |
| 4,815,014 | 3/1989 | Lipner et al. ................... 364/550 |
| 4,833,592 | 5/1989 | Yamanaka ...................... 364/138 |
| 4,843,538 | 6/1989 | Lane et al. ...................... 364/188 |

OTHER PUBLICATIONS

Allen-Bradley Company, Inc., *Programming and Operations Manual*, Bulletin 1772, Mini PLC-2/05 Processor.

ICOM, Inc., *PLC-3 Ladder Logistics User's Manual*, Sep. 1987.

ICOM, Inc., *PLC-5 Ladder Logistics User's Manual*, Sep. 1987.

ICOM, Inc., *PLC-2 Ladder Logistics User's Manual*, Aug. 1987.

*Primary Examiner*—David Y. Eng
*Attorney, Agent, or Firm*—Merchant, Gould, Smith, Edell, Welter & Schmidt

[57] ABSTRACT

The present invention discloses a method of securing access to different functions in a ladder logic programming and monitoring system. Access to various functions of the software package can be controlled using the security system of the software package. When shipped, the security system is disabled. The security system can be activated after a master password is entered for the first time. The person configuring the security system, i.e., the system supervisor, sets up the access rights of all other users. Thereafter, to gain access to the software package, the user must enter his name and unique password. The user can access only those functions assigned to his name and password.

20 Claims, 20 Drawing Sheets

| Maximum Number of Elements | File Type | File Number | 16-bit Words per Element |
|---|---|---|---|
| 32 | Output Image | 0 | 1 |
| 32 | Input Image | 1 | 1 |
| 32 | Status | 2 | 1 |
| 1000 | Bit | 3 | 1 |
| 1000 | Timer | 4 | 3 |
| 1000 | Counter | 5 | 3 |
| 1000 | Control | 6 | 3 |
| 1000 | Integer | 7 | 1 |
| 1000 | Floating Point | 8 | 2 |
| 1000 | User Assigned | 9-999 | 1 |

FIG. 21

| IF (Condition) | Then (Action) |
|---|---|
| Input Bit 01 is On | Turn Output Bit 01 On |

FIG. 22

METHOD AND APPARATUS FOR SECURING ACCESS TO A LADDER LOGIC PROGRAMMING AND MONITORING SYSTEM

FIELD OF THE INVENTION

This invention relates generally to methods of developing ladder logic programs for Programmable Logic Controllers (PLCs). In particular, is directed to a method of securing access to different functions in a ladder logic programming and monitoring system.

BACKGROUND OF THE INVENTION

Programmable logic controllers (PLCs) perform many of the control functions for assembly line machines, machine tools, and other types of industrial equipment. For example, a part arriving at a workstation may contact and close a limit switch or other type of sensing device. As a result, an electrical circuit is completed or broken, and a signal is sent to a PLC indicating the change in condition. The PLC responds to the input as directed by a ladder logic program which, to a large degree, simulates the response of what used to be accomplished by older systems with a set of relays and other control devices. Ladder logic programs instruct the PLC how and when to react to the different signals it receives. The PLC, in turn, instructs the devices it controls in an appropriate manner as specified in the ladder logic program.

A PLC is comprised of a processor, memory, input modules, and output modules. FIG. 19 shows a PLC processor 120 and memory 122, wherein the PLC 118 is (optionally) connected 124 to a personal computer 126. Ladder logic programs may be developed on the personal computer 126 and then downloaded to the PLC 118. The PLC processor 120 executes the ladder logic program. The memory 122 stores output image tables, input image tables, timer storage, counter storage, and ladder logic program workspace. The input modules connect the PLC 118 to input devices and can receive both digital and analog signals. The output modules connect the PLC 118 to machines or other devices and can transmit either digital or analog signals to control them.

In most PLCs, such as those manufactured by the Allen-Bradley Company, memory is structured into "Data Table files" 136-154 as shown in FIG. 21. The memory may be divided into as many as 1000 different Data Table files 136-154. There are a plurality of different types of Data Table files 136-154, each serving a different purpose. These Data Table files comprise the Input Image 138, Output Image 136, Status 140, Bit 142, Timer 144, Counter 146, Control 148, Integer 150, and Floating Point 152 files.

The Input Image Data Table file 138 maintains the status of inputs to the PLC. A single bit in the Input Image Data Table file 138 represents the status of a single I/O point on an input module. If an input bit is ON, then a signal has been received at the input module. If the input bit is OFF, then no signal has been received at the input module.

The Output Image Data Table file 136 controls the outputs from the PLC. A single bit in the Output Image Data Table file 136 represents the status of a single I/0 point on an output module. If an output bit is ON, then the PLC sends a signal to the output module. If the output bit is OFF, then the PLC does not send a signal to the output module.

The Timer Data Table file 144 reflects the status of timers executing in the ladder logic program. Timers keep track of timed intervals according to the ladder logic program. Timers consist of Accumulated Values and Preset Values. The timer intervals are stored in the Timer Accumulators and typically have three bases: (1) 1.0 seconds; (2) 0.1 seconds; and (3) 0.01 seconds. Timer status bits indicate whether the timer is enabled and whether it has timed out.

The Counter Data Table file 146 reflects the status of counters executing in the ladder logic program. Counters accumulate the number of events that occur in a ladder logic program, wherein an event is defined as the transition from a condition of "false" to "true". Counters consist of Accumulated Values and Preset Values. Counter status bits indicate the following: whether the counter has overlowed or underflowed; whether the Accumulator Value is greater than or equal to the Preset Value (i.e., "count complete"); an enable bit for "counter up" instructions; and an enable bit for "counter down" instructions.

The remaining Data Table files, Status 140, Bit 142, Control 148, Integer 150, and Floating Point 152, can perform a number of different functions. The various functions of these Data Table files are not essential to an understanding of the present invention.

The PLC uses addresses to refer to words and bits in the Data Tables files. The addresses allow a ladder logic program to identify Data Table files, elements therein, and bits of the elements. Addresses are generally expressed "<file type> <file number>: <element>. <subelement>/ <bit number>". Thus, the address "B3:10/1" means "Bit file type; File #3; Element #10; bit #1".

Addresses of elements in the Output Image 136 and Input Image 138 Data Table files are specified in octal format, i.e., 00-07 and 10-17 are valid bit addresses. All of the other file types use decimal addresses for elements. Bit type 142 Data Table files are "wordless". Addresses entered in a "word/bit" format are converted by the softward package into a bit-only format. For example, if address B3:10/1 is entered by the user, the software package converts it to B3/161 (10 words ×16 bits/words+1 bit). The Output Image 136, Input Image 138, and Status 140 files are unique in that their maximum sizes are set by the PLC processor type as shown in FIG. 21. The remaining file types 142-154 may contain a maximum of 1000 elements. File types may be duplicated as needed to ocate storage space. For example, if more timers tha the 1000 available in file "T4" are needed, file "T9" can be created. Ideally, the user would assign timers (or other variables) sequentially to conserve memory.

As shown in FIG. 20, the ladder logic program 12 scanned by the processor of the PLC (and used to control the PLC) is a group of statements 130. These statements 130 are often displayed to programmers in a graphical manner comprising ladder diagrams and functional block instructions. Each statement 130, or "rung" of the ladder logic program 128, consists of at least one condition test 132 and at least one action 134 to be performed when the condition is met. When the condition 132 is met, the rung is "true" and some action 134 is taken, for example, a signal is transmitted, a counter is enabled, a timer is started, etc.

FIG. 22 shows an example "rung". If the input bit 01 has been turned "ON" 156 (i.e., a binary value of "1") by an input device, then the PLC responds by turning output bit 01 "ON" 158 (i.e., a binary value of "1").

The typical PLC is comprised of a number of categories of instructions, including a standard set of arithmetic, logical, move, diagnostic, register, comparison, and data transfer instructions, as would be found in any computer. Program control instructions are also available, allowing the user to structure the ladder logic programs.

In addition to the standard set of instructions, PLCs have a number of special-purpose machine control instructions. Relay-type instructions allow the PLC to monitor and control inputs and outputs for both digital and analog devices. Timer and counter instructions control interval timers and event counters. Sequencer instructions let the PLC monitor and control up to 16 I/O status bits at the same time. Immediate I/O instructions scan critical inputs or set critical outputs prior to normal I/O scans. Control instructions are available to let the PLC perform proportional, integral, and derivative (PID) control of processes and equipment.

In prior art ladder logic development systems, programmers can develop ladder logic programs on-line or off-line from the PLC, communicate with the PLC on-line to monitor the program's status, troubleshoot the ladder logic program, force the status of I/O status bits ON or OFF to simulate events, and perform a number of other functions. However, these prior art development systems offer little in the way of productivity aids for the ladder logic programmer and serve primarily as limited platforms for programming ladder logic.

SUMMARY OF THE INVENTION

To overcome the limitations in the prior art described above, and to overcome other limitations that will become apparent upon reading and understanding the present specification, the present invention discloses a method of securing access to different functions in a ladder logic programming and monitoring system.

When the is enabled, a user is required to enter a verified name and password prior before the ladder logic programming and monitoring system can be accessed. In addition, access rights are checked prior to permitting the user to exercise functions of ladder logic programming and monitoring system. Commands entered by the user can be logged for later analysis.

DESCRIPTION OF THE DRAWINGS

In the drawings, where like numerals refer to like elements throughout the several views.

FIG. 21 is an illustration describing the memory structure of the programmable logic controller;

FIG. 22 is an illustration describing the structure of a ladder logic rung; and

DETAILED DESCRIPTION OF THE PREFERRED EMBODIMENT

In the following Detailed Description of the Preferred Embodiment, reference is made to the Drawings which form a part hereof, and in which is shown by way of illustration a specific embodiment in which the invention may be practiced it is to be understood that other embodiments may be utilized and structural changes may be made without departing from the scope of the present invention.

GENERAL DESCRIPTION

The software package embodying the present invention is a menu driven system used to develop ladder logic programs for Programmable Logic Controllers (PLCs). The software package is a programmer's "tool box" for developing ladder logic programs and includes: (1) off-line program development; (2) off-line processor emulation; (3) on-line program development; and (4) on-line station monitoring. Off-line program development provides the user the ability to develop ladder logic programs without connection to a PLC processor. Off-line emulation provides a user the ability to execute and debug ladder programs without the use of a PLC processor. On-line program development provides the user the ability to develop ladder logic programs while being connected to a PLC processor.

Additional information regarding this software package is available in the co-pending and commonly assigned patent applications "A METHOD AND APPARATUS FOR SYMBOLI LADDER LOGIC PROGRAMMING WITH AUTOMATIC ATTACHMENT OF ADDRESSES", by Zifferer et al., "A METHOD AND APPARATUS FOR CROSS-REFERENCE SEARCHING IN LADDER LOGIC PROGRAMS", by Zifferer et al., "A METHOD AND APPARATUS FOR OFF-LINE EMULATION FOR LADDER LOGIC PROGRAMS", by Zifferer et al., and "A METHOD AND APPARATUS FOR CREATING CUSTOM DISPLAYS FOR MONITORING LADDER LOGIC PROGRAMS", by Zifferer et al., all of which applications were filed on even date herewith, and all of which applications are hereby incorporated by reference.

SYSTEM SECURITY

Figure 1:
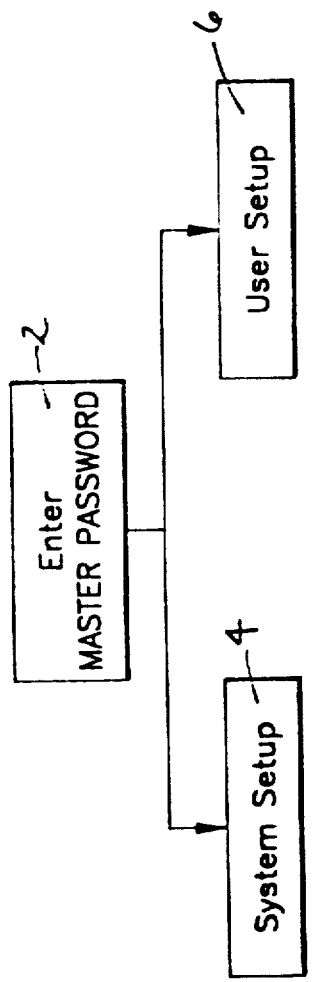
FIG. 1 is a block diagram describing the major components of the Security System.
Figure 3:
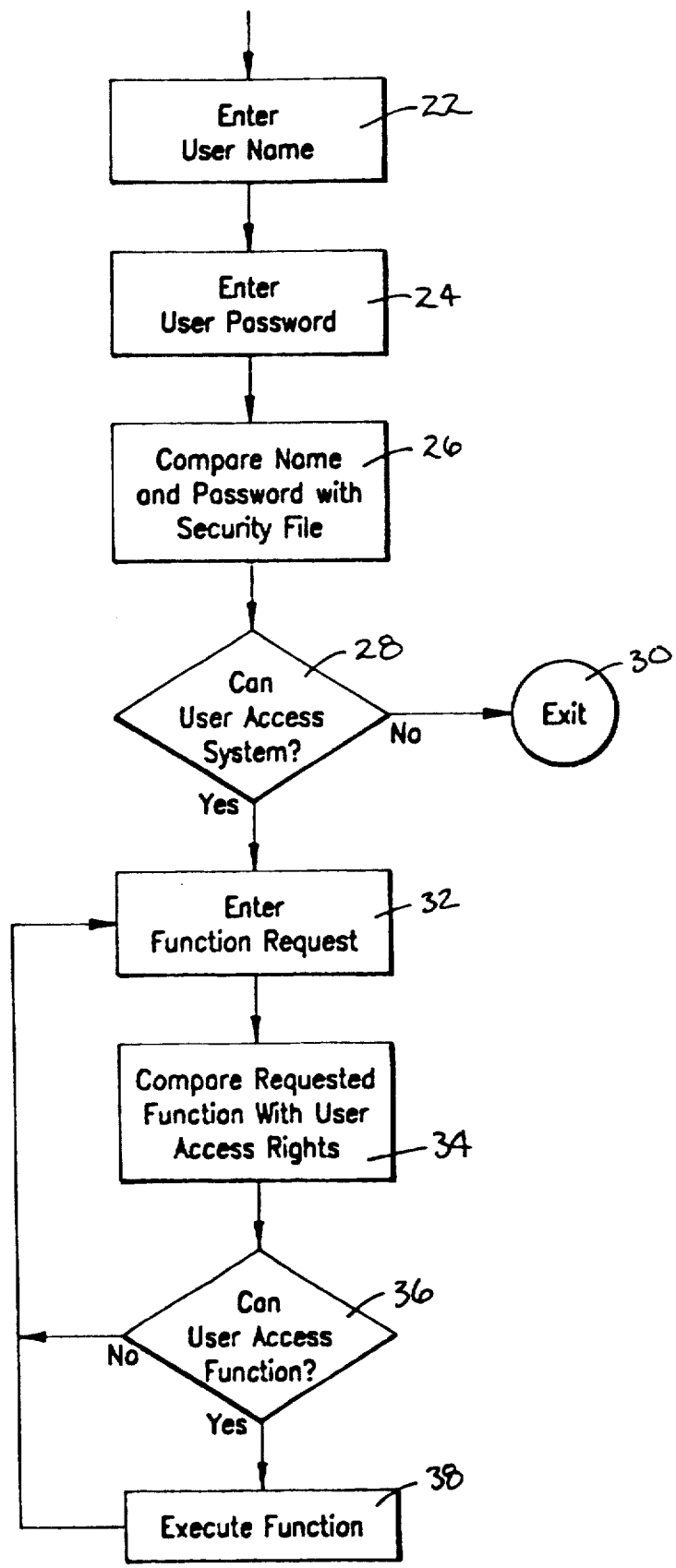
FIG. 3 is a block diagram describing the steps used in determining access rights for users of the software package.

FIG. 1 is a block diagram describing the major components 2-6 of the Security System. Access to various levels of off-line and on-line programming can be controlled using the security system of the software package. When shipped, the security system is disabled. The security system can be activated after a master password is entered for the first time. The person configuring the security system (4), i.e., the system supervisor, sets up the access rights of all other users (6). The block diagram in FIG. 3 describes the operation of an enabled security system. To first gain access to the software package, the user must enter his name (22) and unique password (24). Thereafter, the user can access only those functions which match his assigned access rights (26-38).

Figure 4:
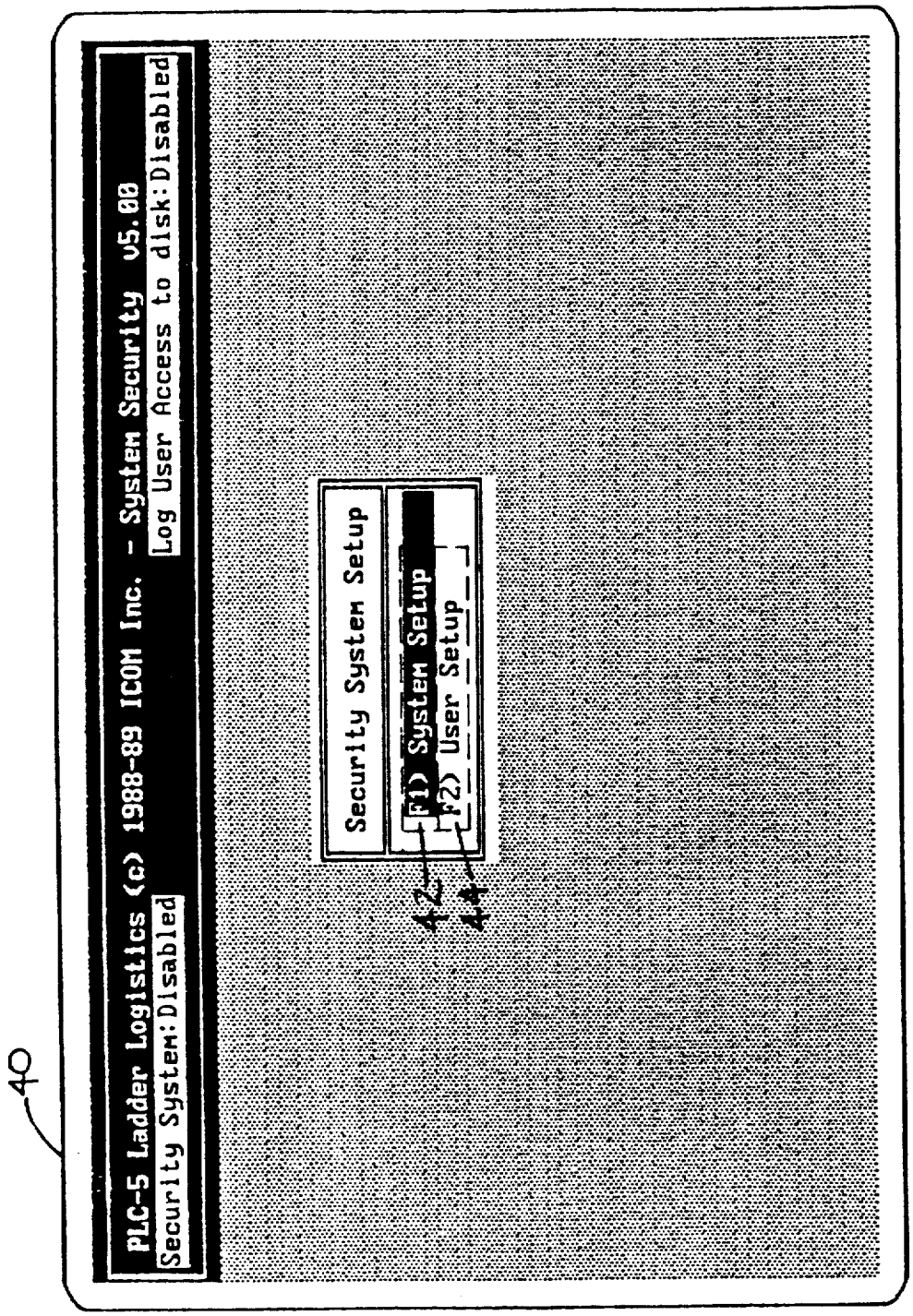
FIG. 4 shows a Security System set-up screen.

FIG. 4 shows a Security System set-up screen 40. The system supervisor may choose to configure the software package by pressing the F1 (System Setup) key 42, or the system supervisor may define users and their associated passwords and access rights by pressing the F2 (User Setup) key 44.

SYSTEM SETUP

Figure 2:
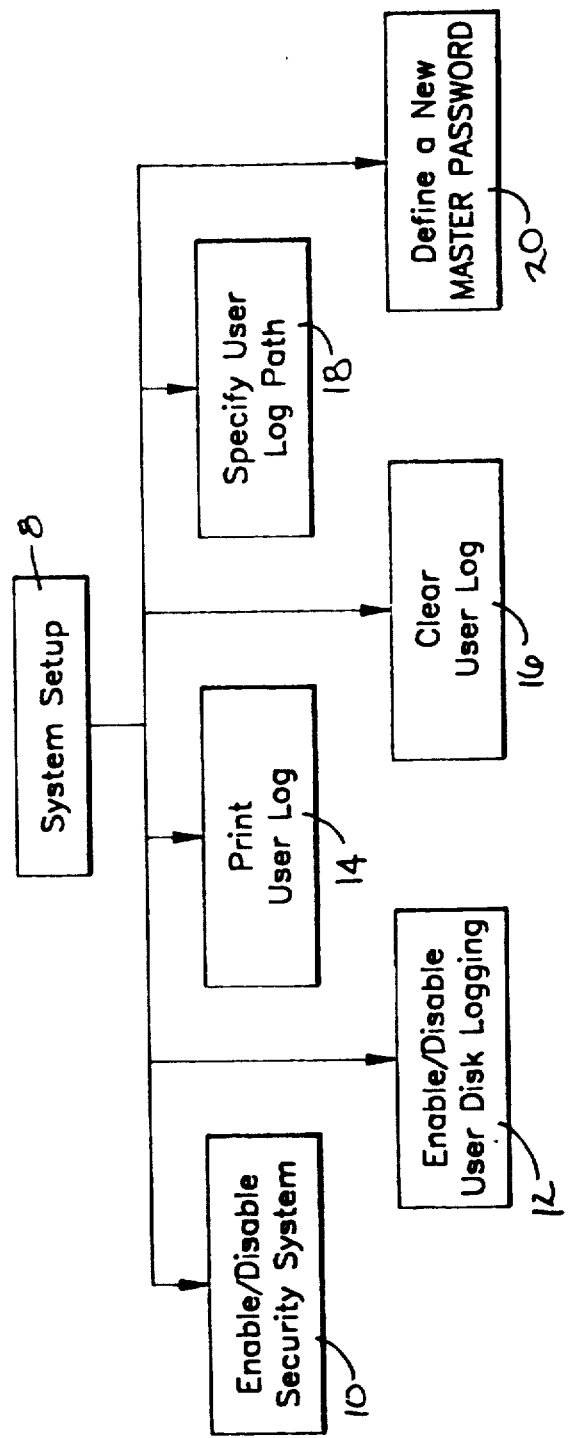
FIG. 2 is a block diagram describing the options available in System Setup.

FIG. 2 is a block diagram describing the options 8-20 available in System Setup. The Security System determines who has access to the software package and who has access to the various features of the software package. This is especially important when unrestricted access to could result in injuries to workers and damage to machinery.

Figure 5:
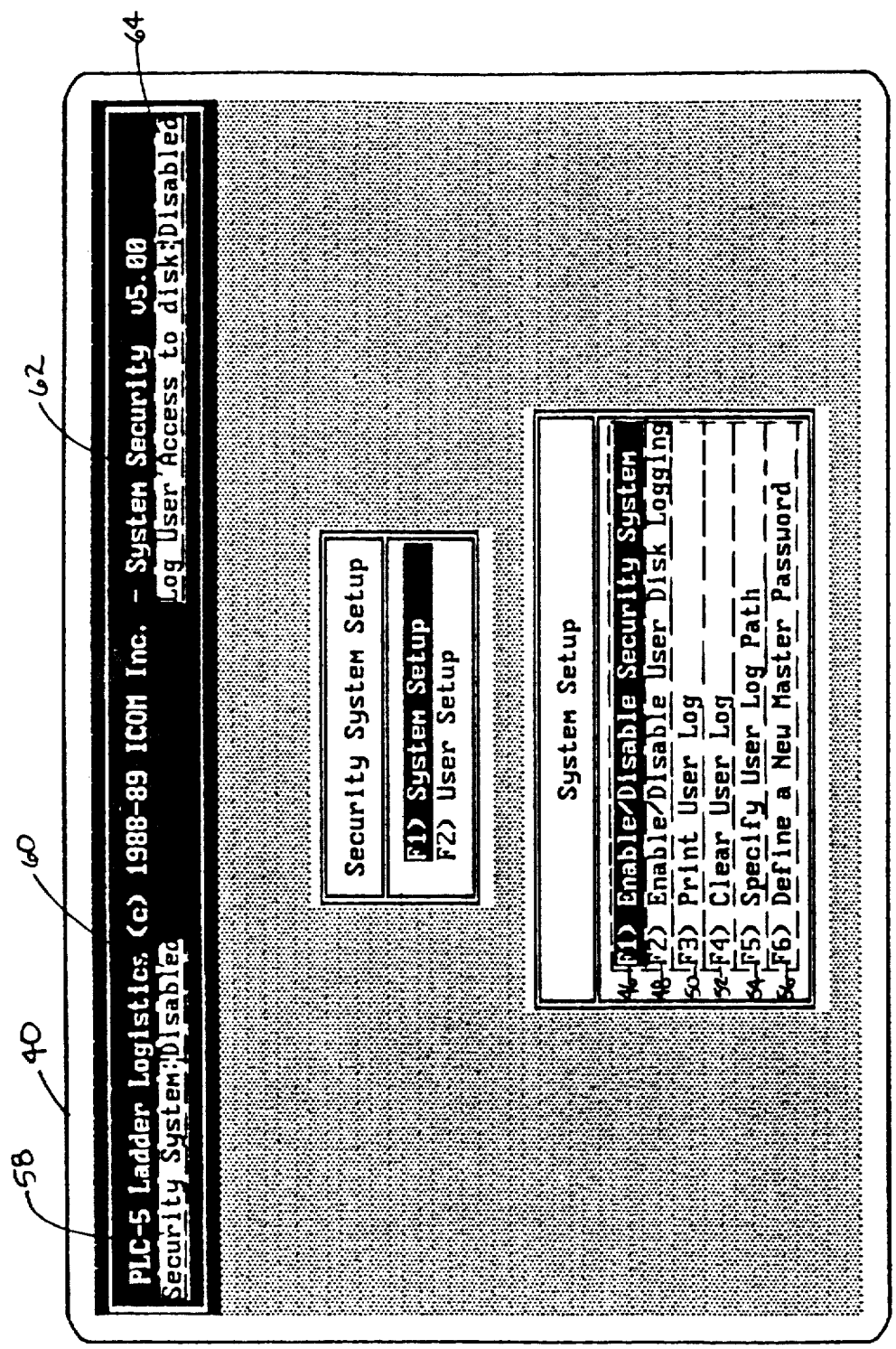
FIG. 5 shows a screen displayed when the system supervisor invokes System Setup from FIG. 4.
Figure 6:
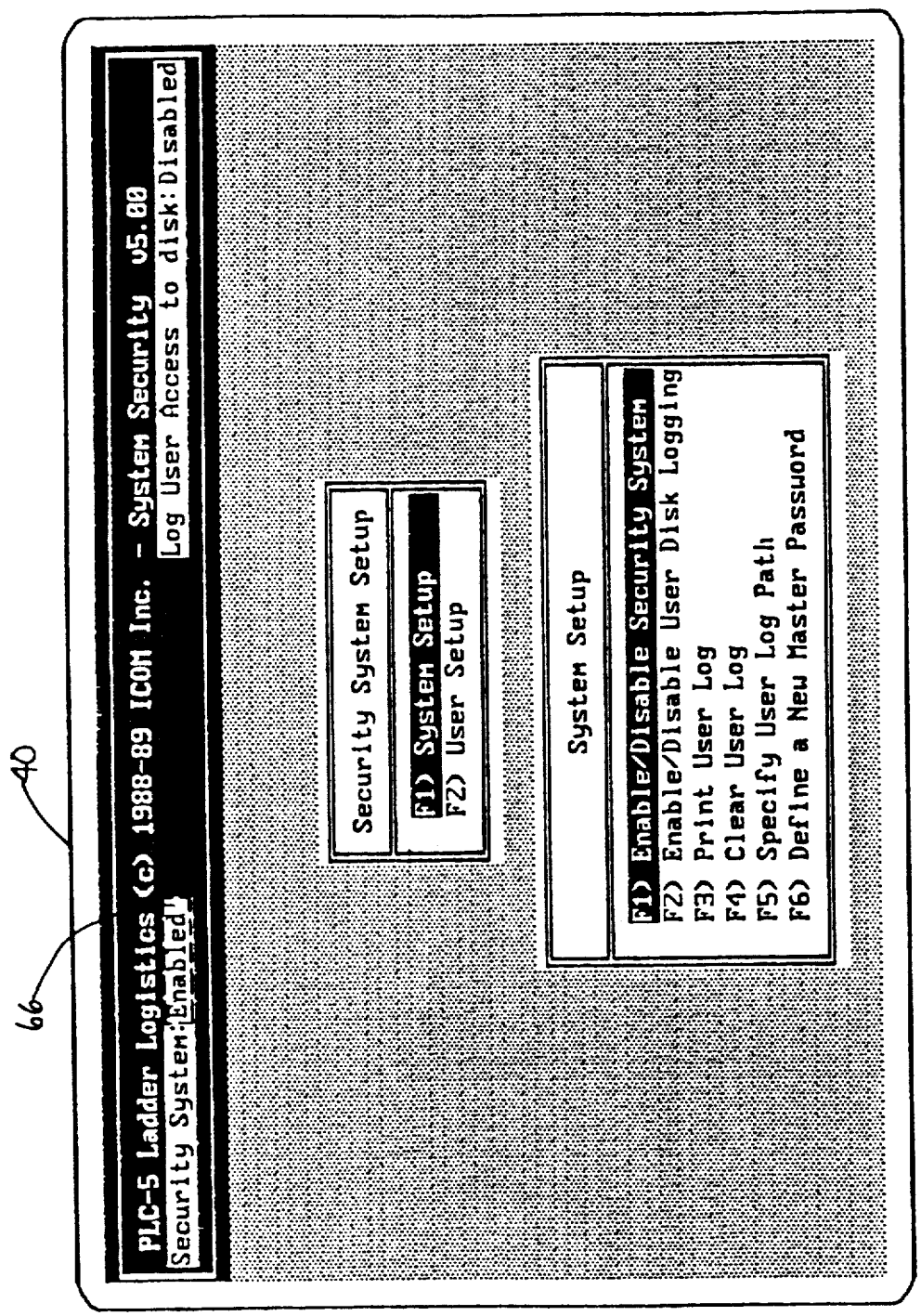
FIG. 6 shows a screen wherein the Security System is enabled.

The screen 40 of FIG. 5 is displayed when the system supervisor invokes System Setup from FIG. 4. The system supervisor may enable or disable the Security System by pressing the F1 (Enable/Disable Security System) key 46. The status of the Security System is displayed in the upper left of the screen, next to the legend "Security System:" 58. FIG. 5 shows a screen 40 wherein the Security System is disabled 60. FIG. 6 shows a screen 40 wherein the Security System is enabled 66.

Figure 7:
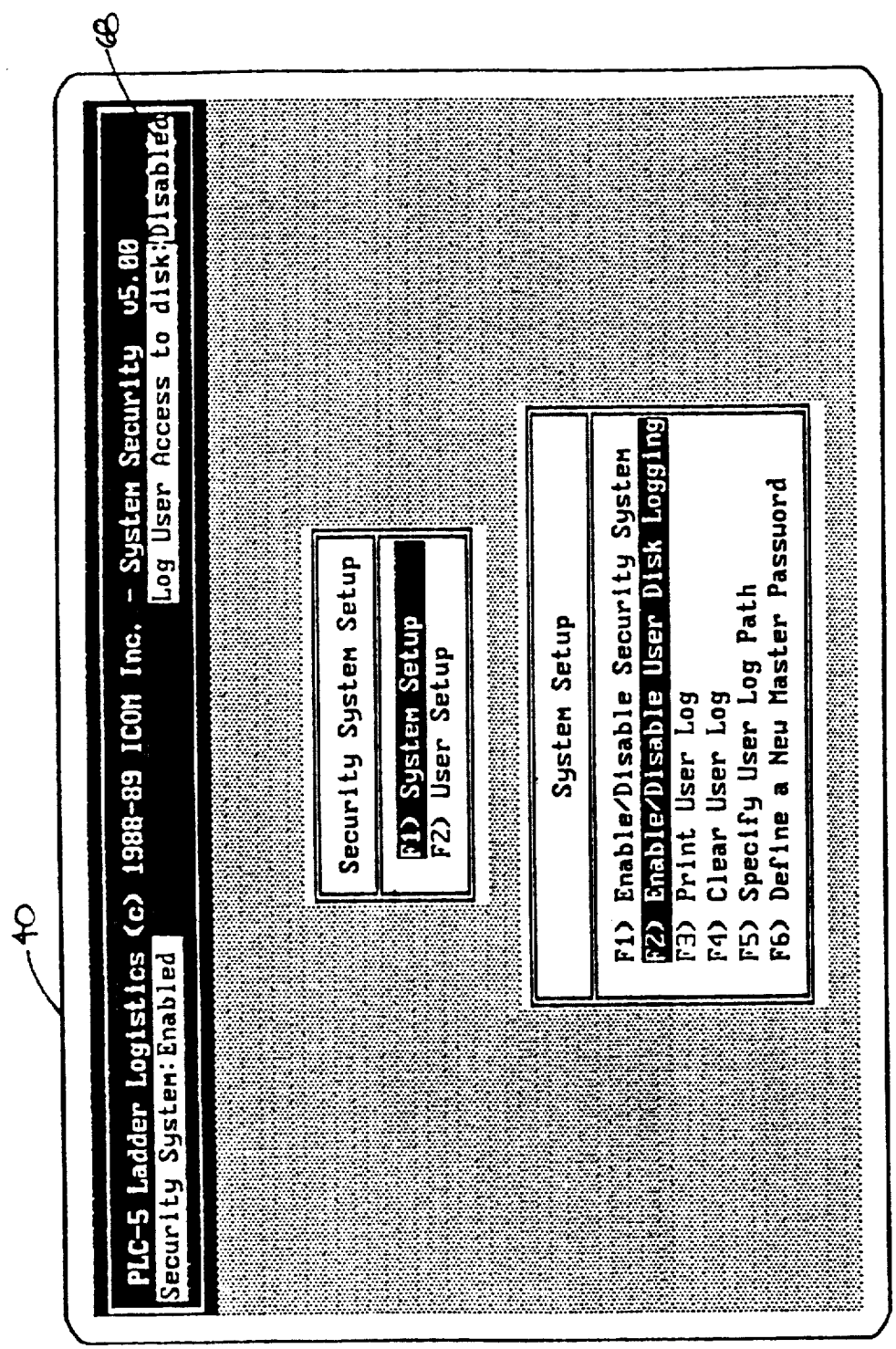
FIG. 7 shows a screen wherein User Disk Logging is disabled.
Figure 8:
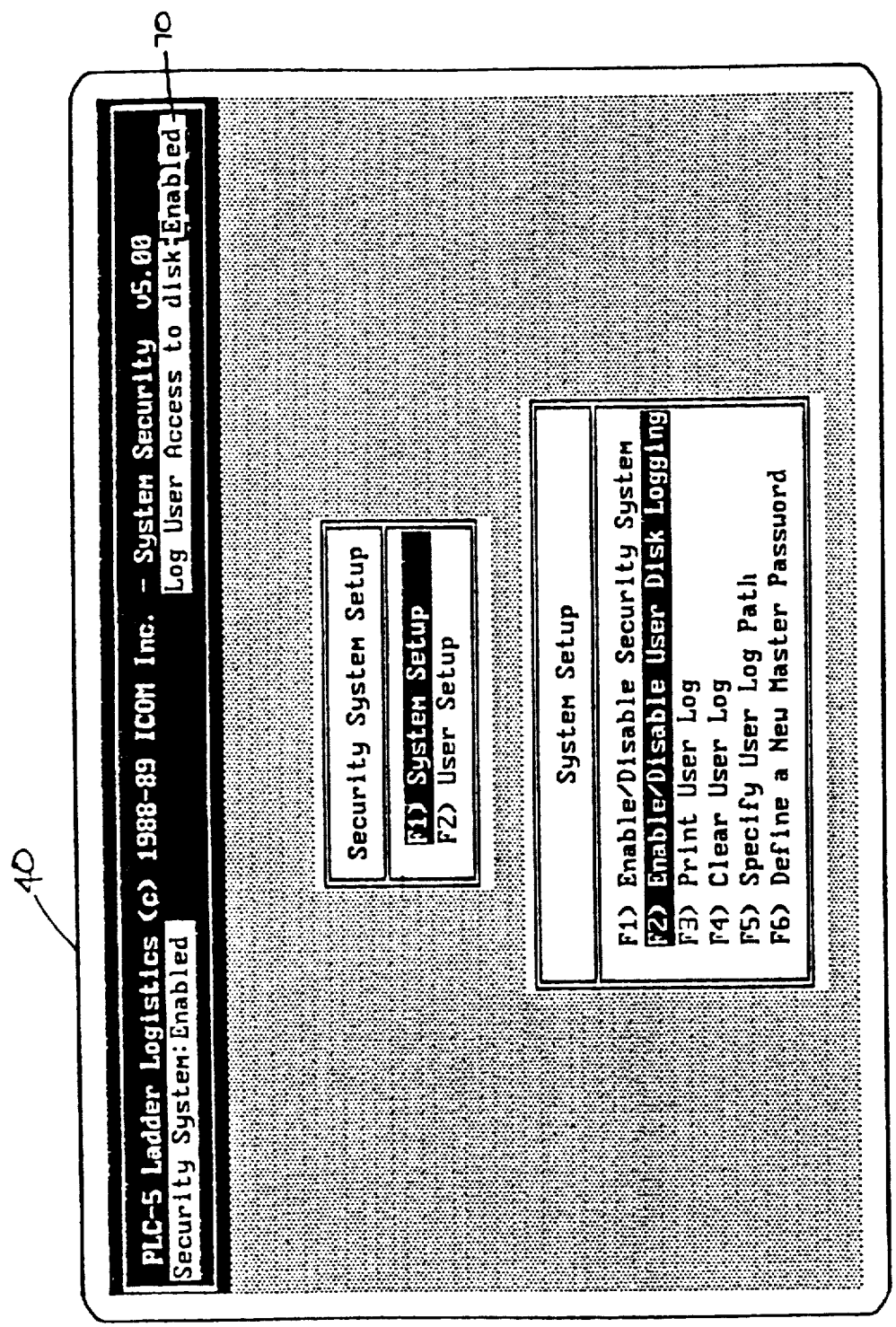
FIG. 8 shows a screen wherein User Disk Logging is enabled.

The system supervisor may enable or disable the User Disk Logging by pressing the F2 (Enable/Disable User Disk Logging) key 48. User Disk Logging saves commands entered by the user into the software package in a disk file. In this way, the system supervisor can track the activities of each user. This is especially important when the software package is communicating with an active PLC, and the user has the ability to change the status and the programming of the PLC. The status of User Disk Logging is displayed in the upper right of the screen, next to the legend "Log User Access to disk:" 62. FIG. 7 shows a screen 40 wherein User Disk Logging is disabled 68. FIG. 8 shows a screen 40 wherein User Disk Logging is enabled 70.

Figure 9:
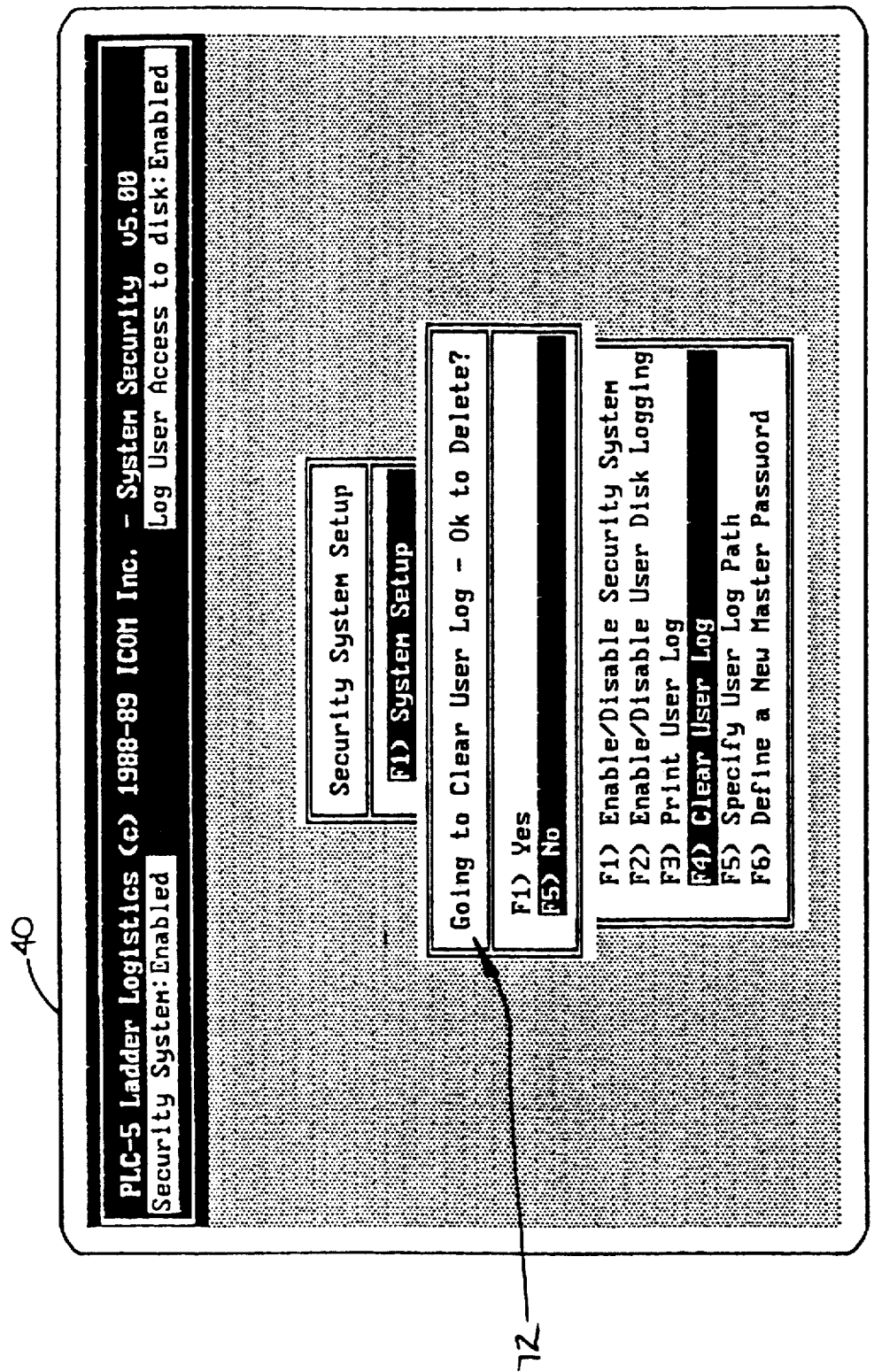
FIG. 9 shows a screen wherein the User Disk Log is cleared.

The system supervisor may print a copy of the User Disk Log by pressing the F3 (Print User Log) key 50. The system supervisor may erase the contents of the User Disk Log by pressing the F4 (Clear User Log) key 52. FIG. 9 shows a screen 40 wherein the system supervisor is prompted again 72, after pressing the F4 (Clear User Log) key 52, to ensure that the User Disk Log is not accidentally deleted.

Figure 10:
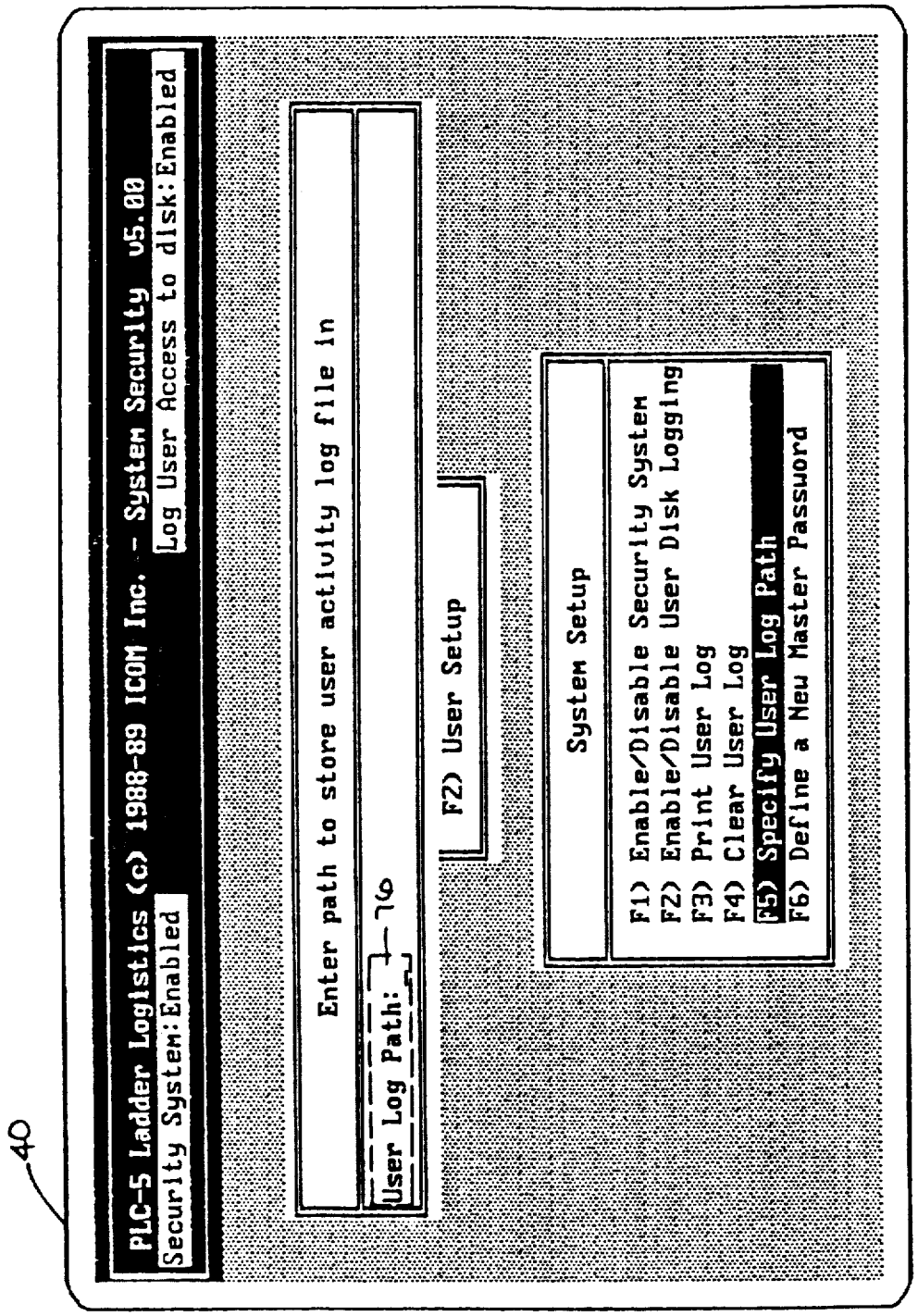
FIG. 10 shows a screen wherein the user enters a disk location for the User Disk Log.

The system supervisor may specify the disk location for the User Disk Log by pressing the F5 (Specify User Log Path) key 54. FIG. 10 shows a screen 40 wherein the system supervisor enters, at the prompt "User Log Path:" 76, the disk location for the User Disk Log.

Figure 11:
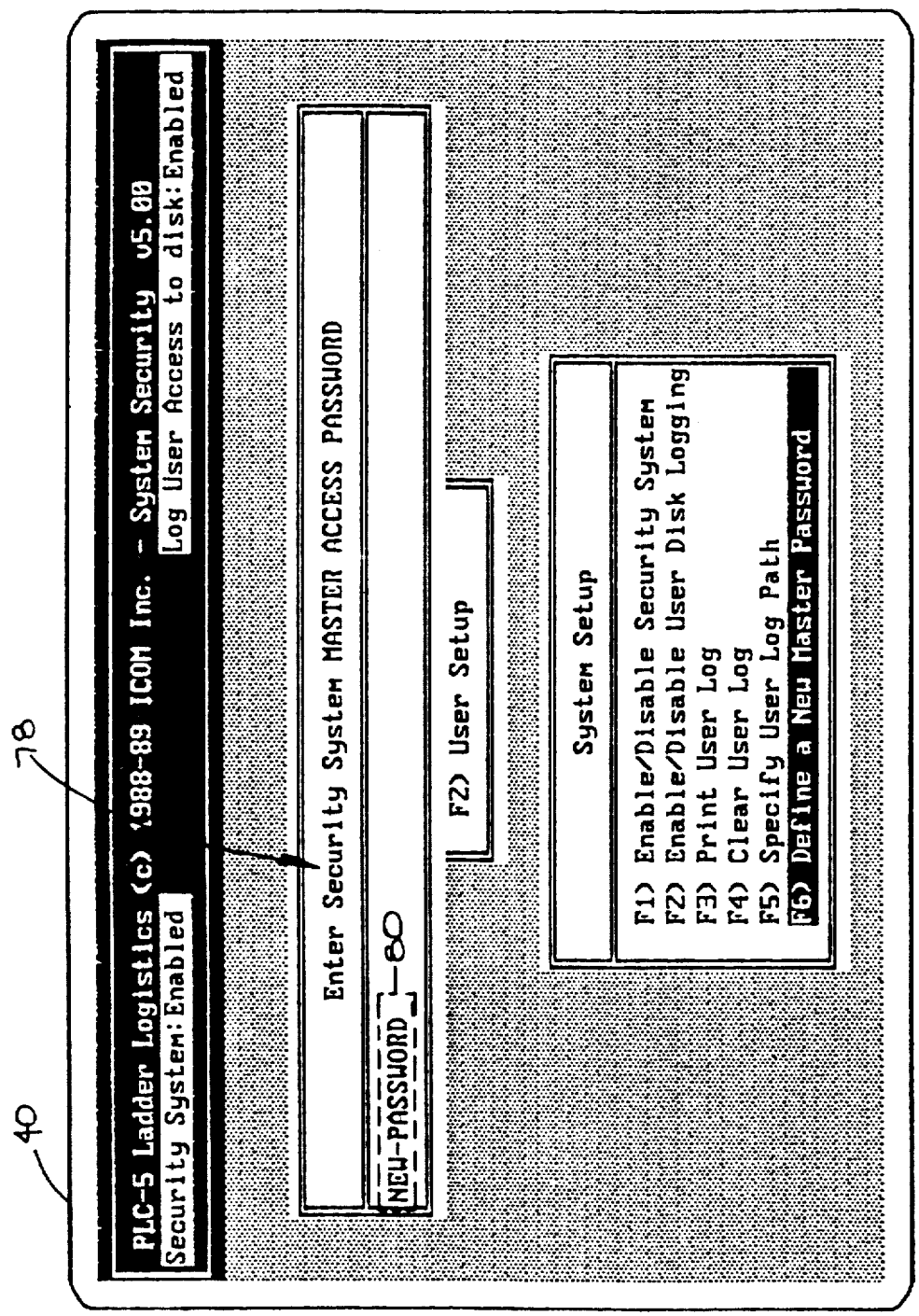
FIG. 11 shows a screen wherein a new Master Password is entered.
Figure 12:
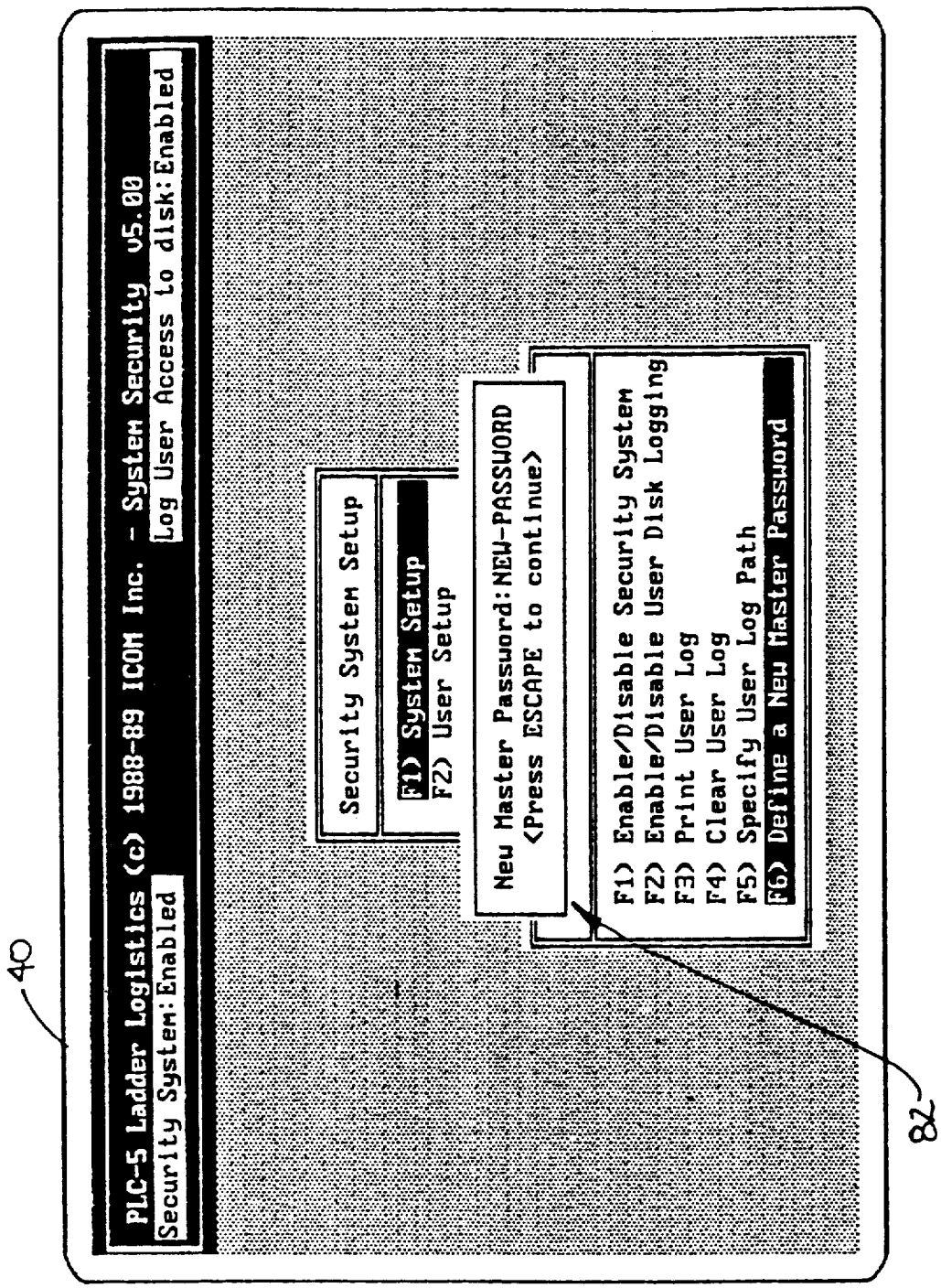
FIG. 12 shows a screen that reminds the system supervisor of the new Master Password.

The system supervisor may define a New Master Password for the Security System by pressing the F6 (Define a New Master Password) key 56. The Master Password is required before the system supervisor can access the Security System menus. In this way, only one (or a few) person has access to the Security System configuration. This is an important feature in managing the use of the software package. FIG. 11 shows a screen 40 wherein a new Master Password, "NEW-PASSWORD" 80, has been entered at the prompt "Enter Security System MASTER ACCESS PASSWORD" 78. After the new Master Password has been entered, the system supervisor presses the Enter key, and the screen 40 shown in FIG. 12 is displayed. This screen 40 provides an "insurance policy", thus reminding the system supervisor of the new Master Password. The system supervisor can only continue on after pressing the Escape key at FIG. 12 (82).

USER SETUP

Figure 13:
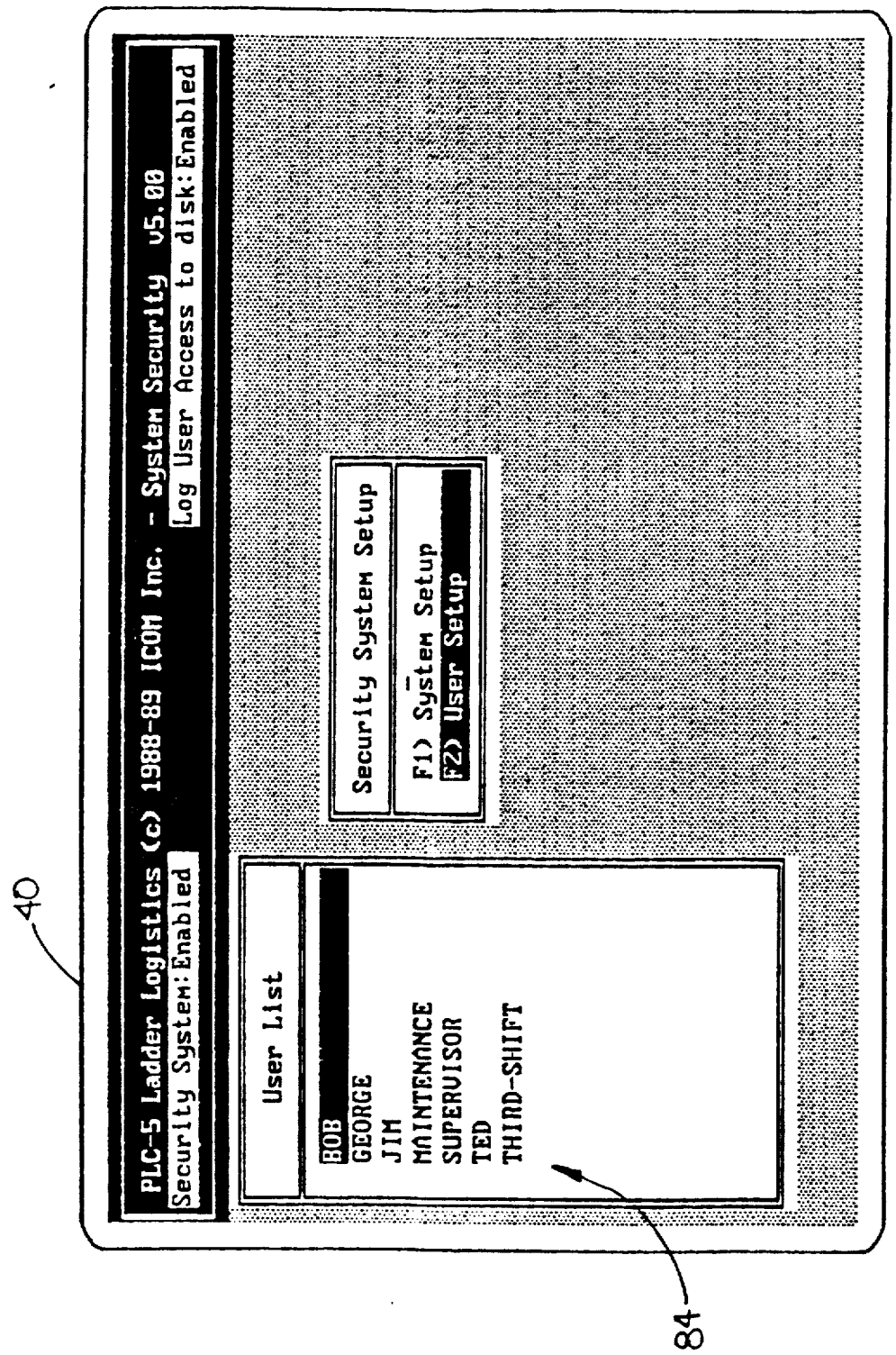
FIG. 13 shows a User List of currently defined user names known to the Security System.

In User Setup, the system supervisor specifies the user names, the user passwords, and their respective access rights to various functions performed by the software package. The screen 40 of FIG. 13 is displayed when the system supervisor invokes User Setup from FIG. 4. The screen 40 of FIG. 13 shows a User List 84 of currently defined user names known to the Security System.

Figure 14:
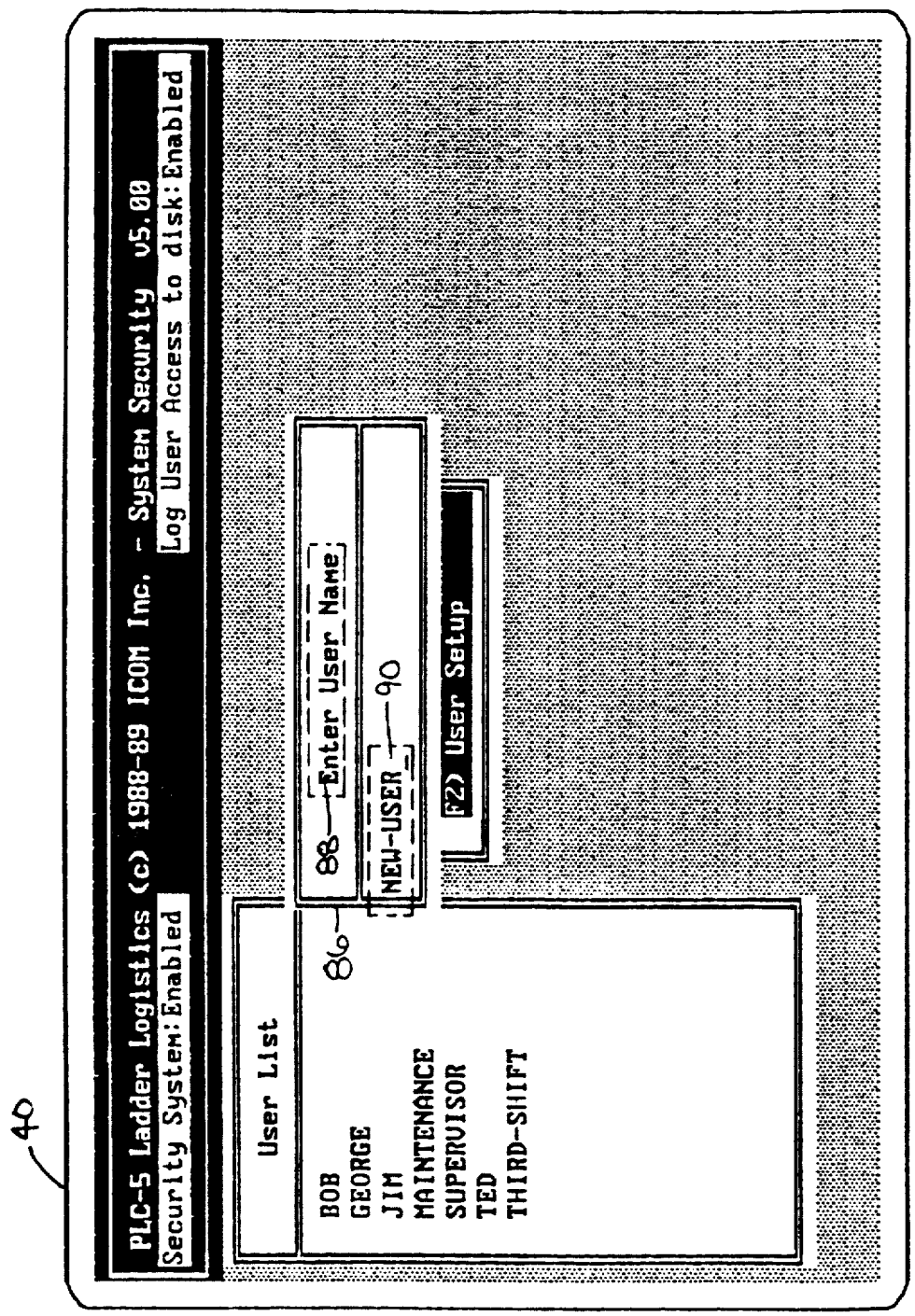
FIG. 14 shows a screen wherein a new user name is entered.
Figure 15:
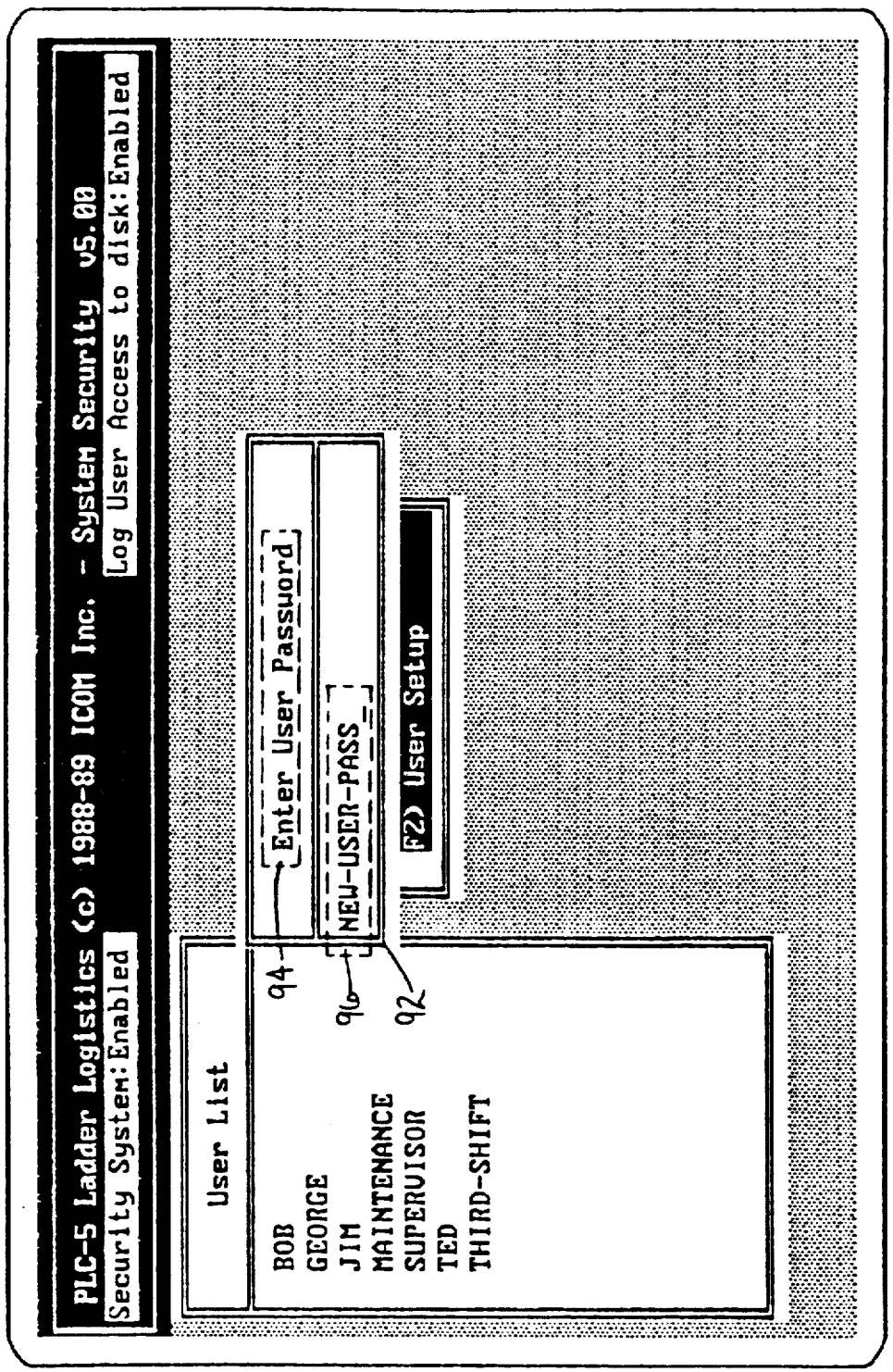
FIG. 15 shows a screen wherein a new user password is entered.

The system supervisor may add new user names to the User List 84 by pressing the Insert key. The window 86 shown in FIG. 14 is displayed on the screen 40, prompting the system supervisor to "Enter User Name" 88. The system supervisor specifies the user name, for example "NEW-USER" 90, and presses the Enter key. The window 92 shown in FIG. 15 is displayed on the screen 40, prompting the system supervisor to "Enter User Password" 94. The system supervisor specifies the user password, for example "NEW-USER-PASS" 96, to associate with the user name "NEW-USER" 90. The window 98 shown in FIG. 16 is displayed on the screen 40, prompting the system supervisor to define the user's access rights 100.

Figure 16:
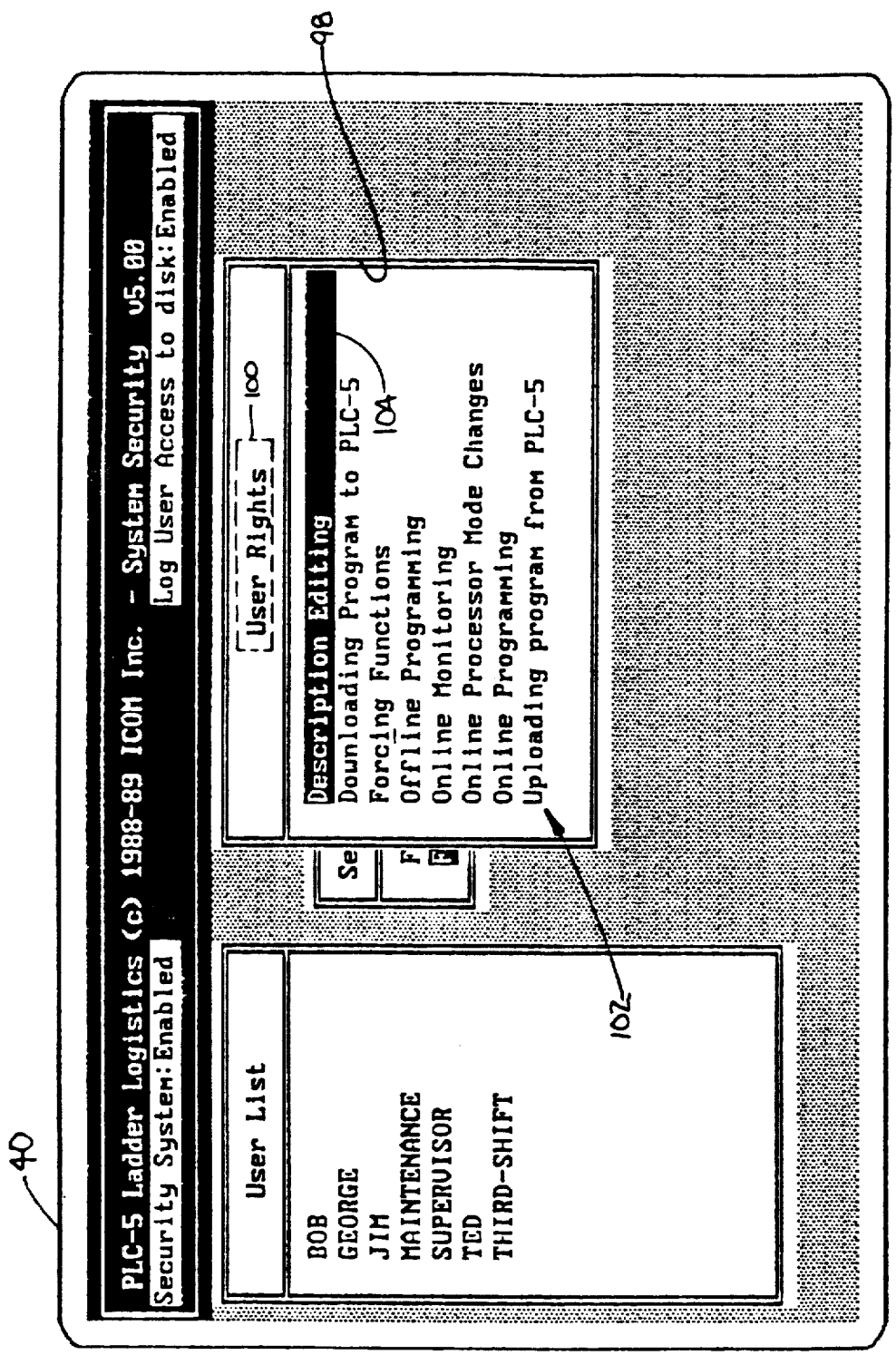
FIG. 16 shows a screen wherein a new user's access rights are defined.

FIG. 16 shows a full list 102 of User Rights. The software package is comprised of a plurality of functions requiring a right of access. These functions include: (1) Data Table modification; (2) description editing; (3) downloading programs to the PLC processor; (4) forcing functions; (5) off-line programming; (6) on-line monitoring; (7) on-line processor mode changes; (8) on-line programming; and (9) uploading programs from the PLC processor. The user is prevented from invoking a function without access rights thereto.

Figure 17:
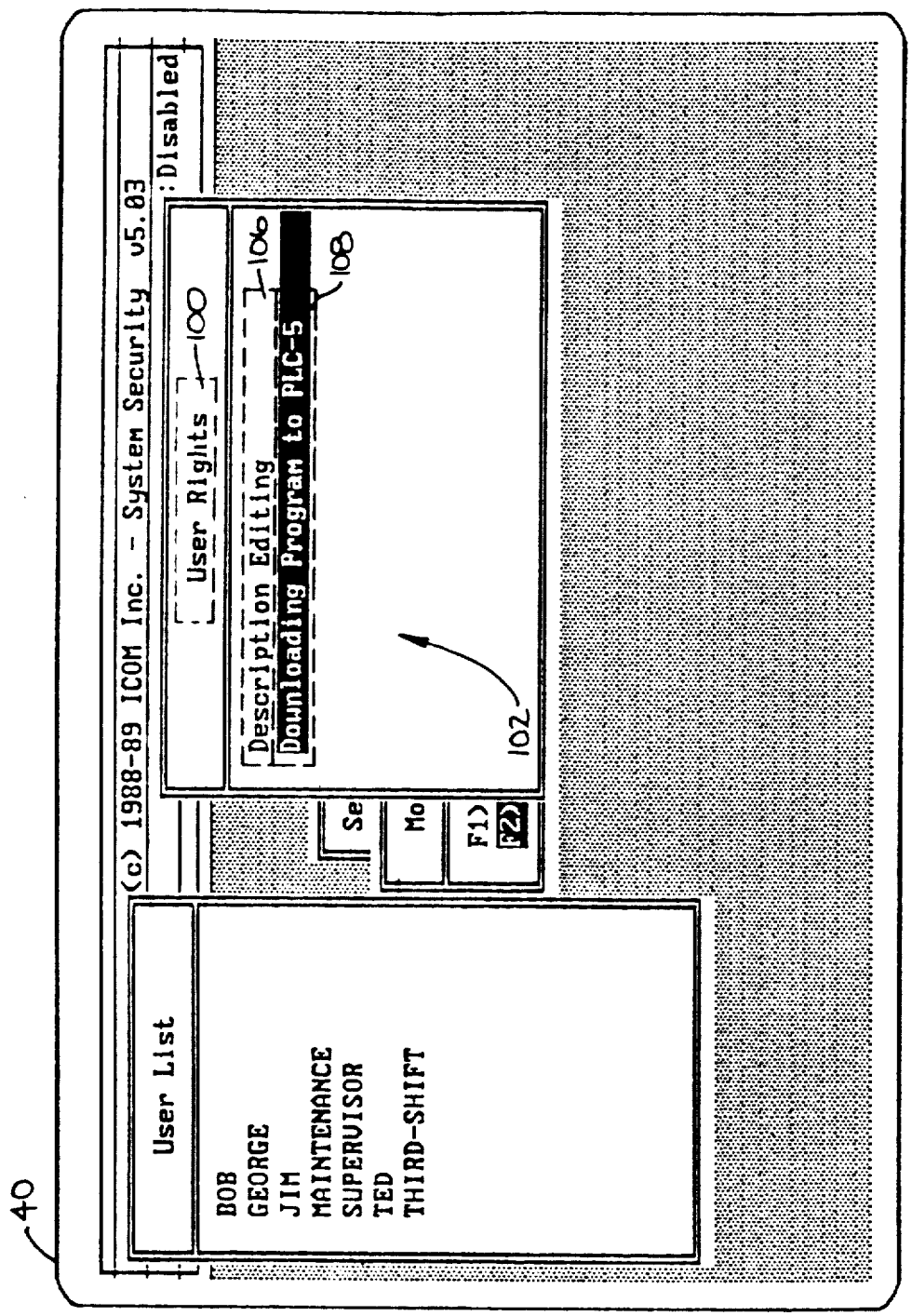
FIG. 17 illustrates how a user may restricted in his access rights.
Figure 18:
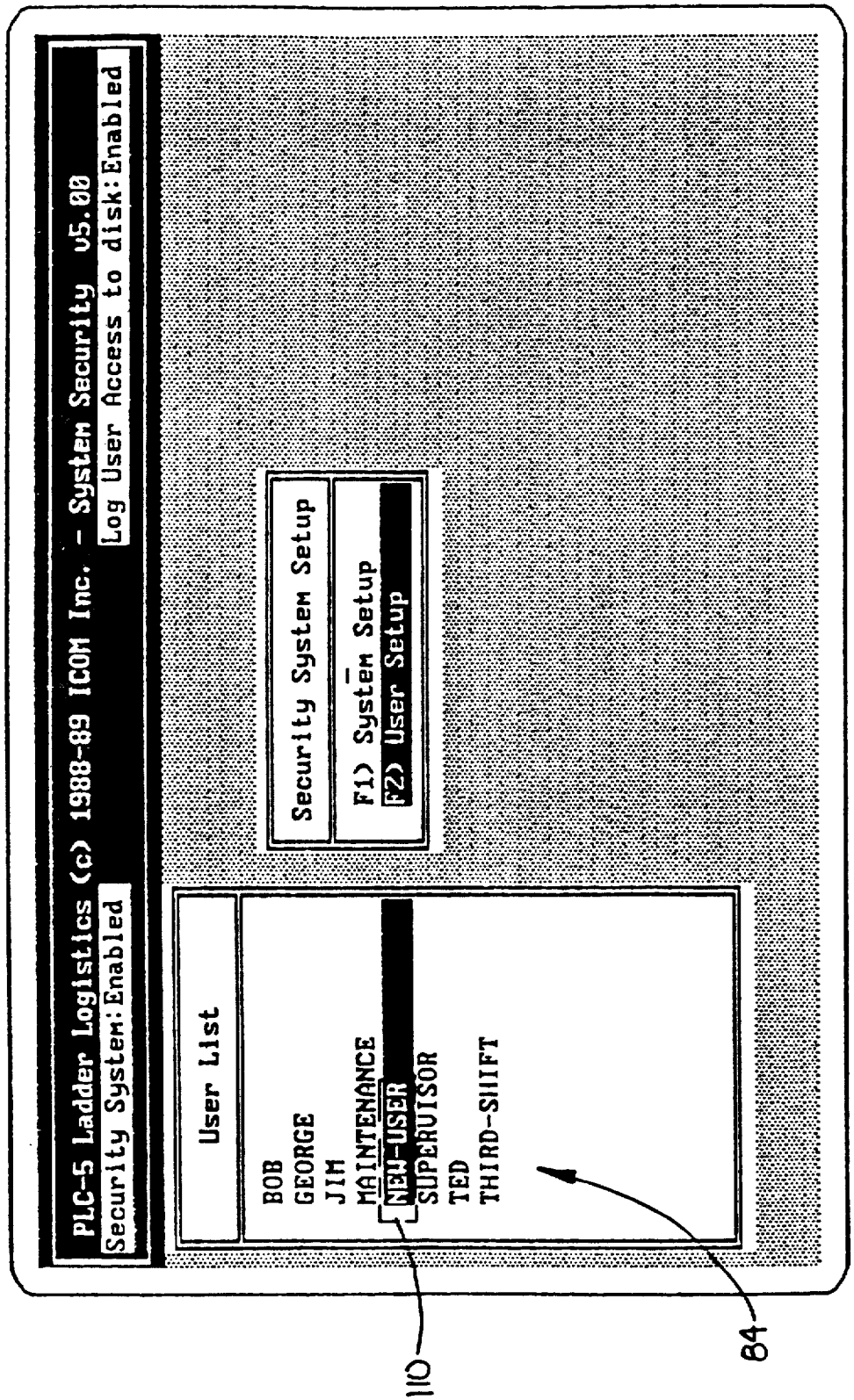
FIG. 18 shows the screen of FIG. 13 with the new user added to the User List.
Figure 19:
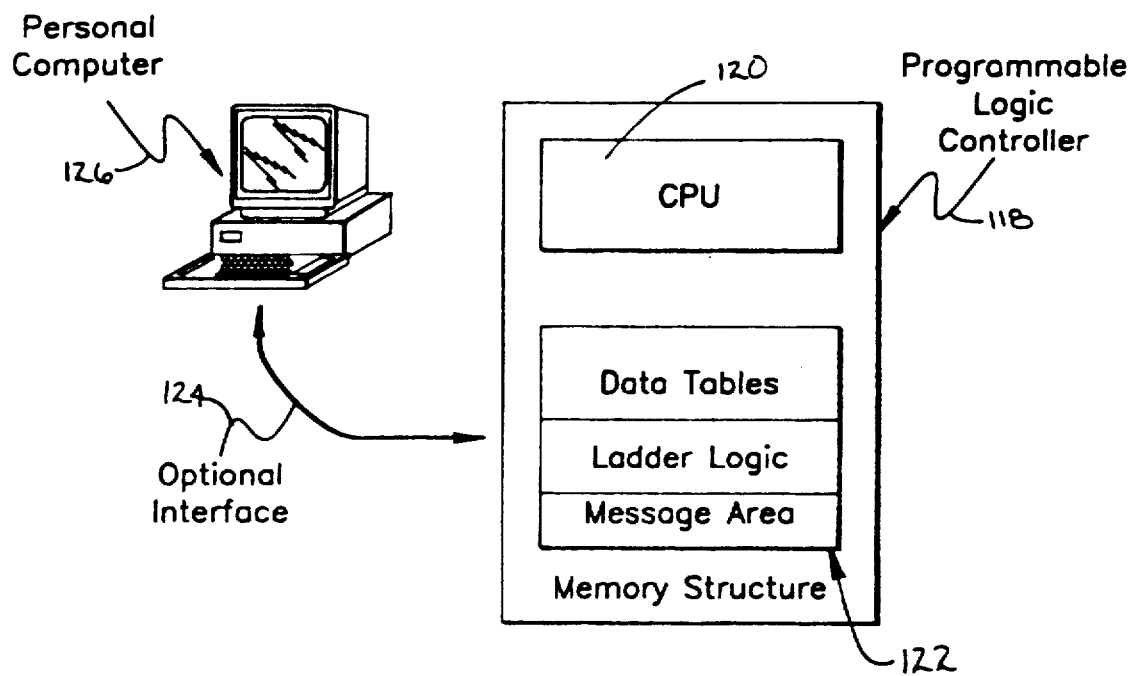
FIG. 19 is an illustration describing a programmable logic controller with an optional computer attached thereto.
Figure 20:
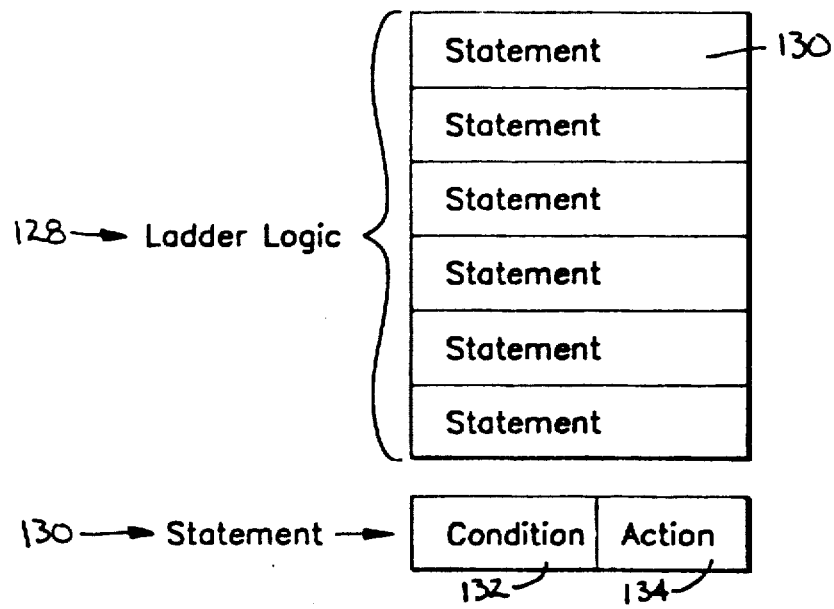
FIG. 20 is an illustration describing the structure of a ladder logic program in the programmable logic controller.

User Rights can be removed by positioning the cursor 104 on a particular User Right 102, thereby highlighting the User Right, and pressing the Delete key. FIG. 17 illustrates how the user has been restricted to only two User Rights 102: "Description Editing" 106 and "Downloading Program to PLC-5" 108. After the User Rights have been specified by the system supervisor, the user name 110 is added to the User List 84 as shown in FIG. 18. The system supervisor then exits from the Security System.

Figure 23:
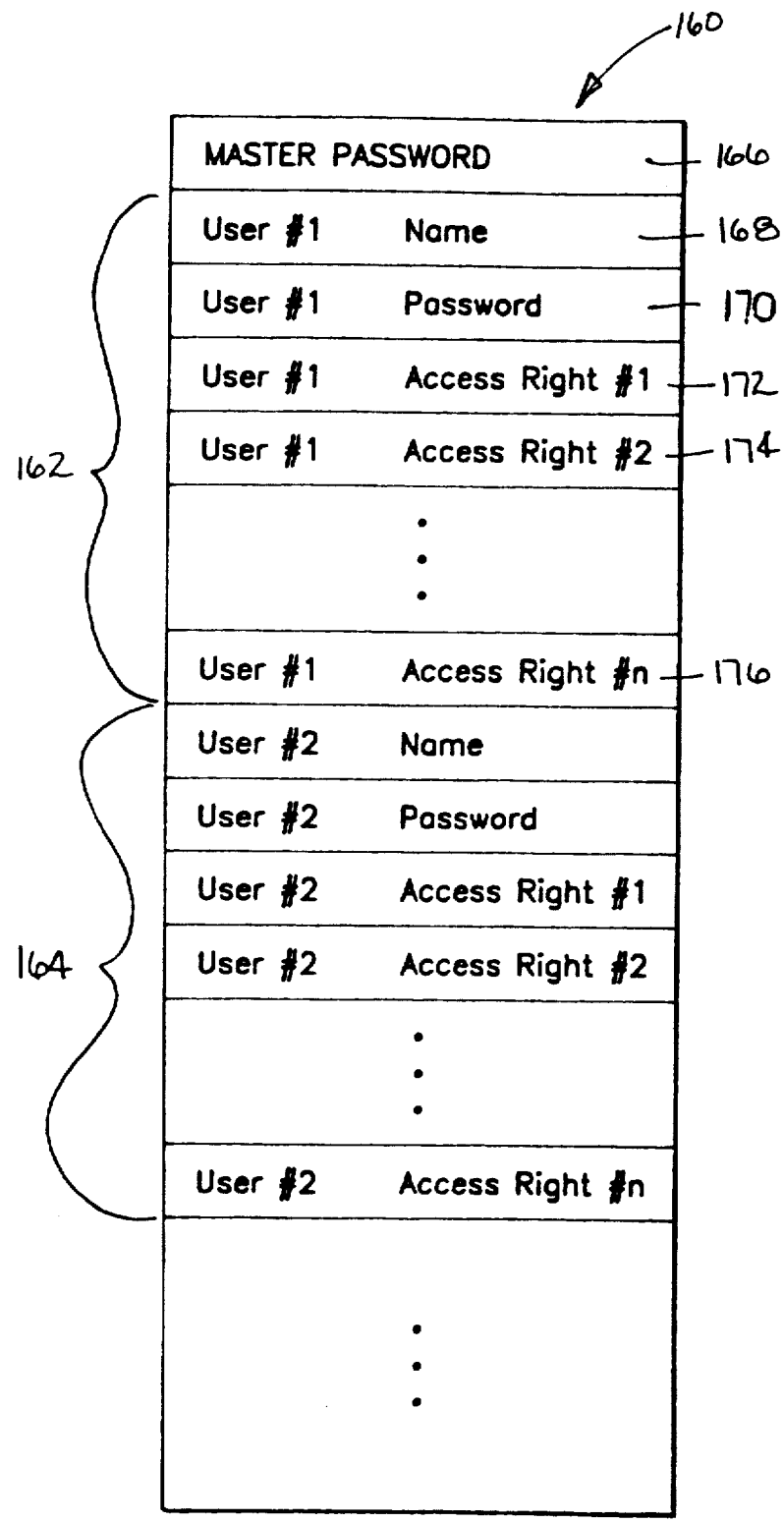
FIG. 23 shows the structure of the security file.

FIG. 23 shows describes a database file 160 that maintains the System Security information. The file 160 is comprised of a Master Password record 166 and a plurality of User Records 162 and 164. Each User Record 162 or 164 in the file 160 is comprised of a User Name 168, a User Password 170, and a plurality of Access Right identifiers 172-176.

CONCLUSION

Although a specific embodiment of the present invention has been illustrated herein, it will be appreciated by those in ordinary skill in the art that any method or arrangement which is calculated to achieve the same purpose may be substituted for the specific embodiment shown. Thus, the present invention disclosed herein may be implemented through the use of different display screens, different commands, different key combinations, and different steps. This application is intended to cover any adaptations or variations thereof. Therefore, it is manifestly intended that this invention be limited only by the claims and the equivalence thereof.

What is claimed is:

1. A security system for a software program executed by a computer, the software program having a plurality of operator selectable functions, the security system comprising:
   (a) set-up means for defining a user's access to the software program and to the operator selectable functions therein, wherein the set-up means comprises means for accepting a user name and password, means for displaying a list of mnemonics corresponding to operator selectable functions, means for selectively adding and deleting mnemonics to and from the list, means for granting and denying access rights to the operator selectable functions in accordance with which mnemonics are displayed in the list, means for associating the access rights with the user name and password, and means for storing the suer name, password, and access rights in memory;
   (b) system access means, coupled to the memory, for determining whether an operator can access the software program, wherein the system access means comprises means for comparing an entered user name and password with one or more user names and passwords stored in the memory, and means for granting access to the software program when the entered user name and password match a stored user name and password; and
   (c) function access means, coupled to the memory and the system access means, for determining whether the operator can access one or more of the operator selectable functions in the software program, wherein the function access means comprises means for comparing a selected function to the stored access rights associated with the stored user name and password that match the entered user name and password, and means for invoking the selected function when it matches the stored access rights.

2. The system of claim 1, wherein the set-up means further comprises means for defining a master password for accessing the set-up means.

3. The system of claim 2, further comprising means for storing the master password.

4. The system of claim 1, wherein the set-up means further comprises means for enabling and disabling the security system.

5. The system of claim 4, further comprising means for displaying a status of the security system indicating whether it is enabled or disabled.

6. The system of claim 1, wherein the set-up means further comprises means for enabling and disabling a user disk log, wherein commands entered by a user and saved into a file so that the activities of the user can be monitored at a later time.

7. The system of claim 6, further comprising means for displaying a status of the user disk log.

8. The system of claim 6, further comprising means for printing a copy of the user disk log.

9. The system of claim 6, further comprising means for erasing the user disk log.

10. The system of claim 6, further comprising means for specifying a location for the user disk log.

11. A method of securing a software program executed by a computer, the software program having a plurality of operator selectable functions, the method comprising:
   (a) defining a user's access to the software program and to the operator selectable functions therein, wherein the defining step comprises accepting a user name and password, displaying a list of mnemonics corresponding to operator selectable functions, selectively adding and deleting mnemonics to and from the list, granting and denying access rights to the operator selectable functions in accordance with which mnemonics are displayed in the list, associating the selected access rights with the user name and password, and storing the user name, password, and selected access rights in memory;
   (b) determining whether an operator can access the software program, wherein the determining step comprises comparing an entered user name and password with one or more user names and passwords stored in the memory, and granting access to the software program when the entered user name and password match the stored user name and password; and
   (c) determining whether the operator can access one or more of the operator selectable functions in the software program, wherein the determining step comprises comparing a selected function to the stored access rights associated with the stored user name and password that match the entered user name and password, and invoking the selected function when it matches the stored access rights.

12. The method of claim 11, wherein the defining step further comprises defining a master password for accessing the set-up means.

13. The method of claim 12, further comprising storing the master password.

14. The method of claim 11, wherein the defining step further comprises enabling and disabling the security system.

15. The method of claim 14, further comprising displaying a status of the security system indicating whether it is enabled or disabled.

16. The method of claim 11, wherein the defining step further comprises enabling and disabling a user disk log, wherein commands entered by a user are saved into a file so that the activities of the user can be monitored at a later time.

17. The method of claim 16, further comprising displaying a status of the user disk log.

18. The method of claim 16, further comprising printing a copy of the user disk log.

19. The method of claim 16, further comprising erasing the user disk log.

20. The method of claim 16, further comprising specifying a location for the user disk log.

* * * * *

UNITED STATES PATENT AND TRADEMARK OFFICE
CERTIFICATE OF CORRECTION

PATENT NO. : 5,127,099
DATED : June 30, 1992
INVENTOR(S) : Scott C. Zifferer et al.

It is certified that error appears in the above-identified patent and that said Letters Patent is hereby corrected as shown below:

Column 2, line 19, "overlowed" should read --overflowed--; line 34, insert --as-- after "expressed"; line 37, "bit #1" should read --Bit #1--; line 44, "softward" should read --software--; line 52, after "needed", "t ocate" should read --to allocate--; line 53, after "timers", "tha" should read --than--; line 57, "12" should read --128--. Column 3, line 42, after "the" insert --security system--. Column 4, line 17, after "may" insert --be--; line 39, after "practiced" insert a period (--.--); line 39, before "is", "it" should read --It--; line 63, "SYMBOLI" should read --SYMBOLIC--. Column 7, line 4, after "shows" insert --and--; line 15, after "those", "in" should read --of--; line 42, after "the", "suer" should read --user--.

Signed and Sealed this

Fifth Day of October, 1993

Attest:

BRUCE LEHMAN

Attesting Officer    Commissioner of Patents and Trademarks